UNITED STATES PATENT OFFICE.

FEUILLEN GRAND' MONTAGNE, OF BRUSSELS, BELGIUM.

PROCESS OF MANUFACTURING ARTIFICIAL MARBLES.

SPECIFICATION forming part of Letters Patent No. 527,969, dated October 23, 1894.

Application filed May 16, 1894. Serial No. 511,505. (No specimens.) Patented in Belgium June 9, 1892, No. 100,054, and July 18, 1892, No. 100,492; in France December 6, 1892, No. 226,209, and in England January 24, 1893, No. 1,582.

*To all whom it may concern:*

Be it known that I, FEUILLEN GRAND' MONTAGNE, manufacturer, of Brussels, in the Kingdom of Belgium, have invented new and useful Improvements in a new Process of Manufacturing Artificial Marbles, (for which no patent has been obtained in any country except in Belgium June 9, 1892, No. 100,054, and July 18, 1892, No. 100,492; in France December 6, 1892, No. 226,209, and in England January 24, 1893, No. 1,582,) of which the following is a specification.

The present invention has for its object the manufacture of artificial marbles in the form of plates, slabs or blocks of all dimensions and thicknesses, traversed by veining and coloring—of the marble it is desired to imitate—extending right through the material in such a manner that the entire mass will have the appearance of the natural marble, exactly as it occurs in nature. To obtain this result, I employ well known cements, and in particular cements which are perfectly white such as magnesian cements composed of magnesia and chloride of magnesium; cements of silicate of aluminia and of lime; English cements known under the name of Keen's cement, &c. I may also employ colored cements such as Portland cements, or cements made of slag, but only for certain highly colored marbles. However none of these cements has the hardness and resonance required to enable them to imitate the natural marbles, and it is for this reason that with the exception of the magnesian cements which are employed as they are, all the other cements must be treated in a special manner. Instead of simply tempering the cements with water only, I temper them with an acid solution of sulfate of zinc or of other metal suitable for the ground color of the marble to be produced. The solution should be of greater concentration the greater the degree of hardness desired.

In practice the solution lies between ten and twenty per cent., and the amount of metallic oxide mixed with the sulfuric acid varies according to the shade it is desired to produce. For certain marbles, instead of the sulfuric acid is employed hydrochloric acid which is used in the same manner. The dry cement is tempered with the metallic solution to the consistency required for working the marble.

The mode of manufacture varies according to the nature of the marble it is desired to produce, and also according to whether the marble is merely mottled or veined. In the first case the cement formed into a paste is divided into as many portions as there are shades of color in the marble to be produced, and each of these portions is colored accordingly. The artist then mingles these different portions of paste in such a manner as to produce the desired effect, and he spreads all these portions in a suitable mold, arranging the colors together in accordance with the nature of the marble to be produced.

If the marble to be produced is to be traversed by large veins, the mode of manufacture is slightly modified. The various shades of color of the marble are prepared as above stated, but in a much more fluid condition. Further, the various colors of the veins are arranged in different vessels, and in these vessels the prepared colors may be mixed with a small quantity of cement so as to slightly thicken the thin pastes. Moreover long tresses or long skeins of silk are prepared of various thicknesses varying from single threads up to tresses of one centimeter and more. These tresses are first dipped in the metallic solution hereinabove referred to, and are then immersed in the various colors with which they are thoroughly impregnated. They are then arranged on the bottom of the mold, and into the latter are poured the various portions of cement colored as herein before described. When the mold has been filled in this way, all the silk tresses are withdrawn singly and in a vertical manner, thereby producing in the paste cuts or fissures both sides or faces of which retain the color of the tresses, and which faces, when brought together by the pressure produced by the operation of the trowel employed to even the material in the mold, produce veinings that extend throughout the mass of the plate or slab.

According to the subsequent use of the marble, I mix with the cement, while it is being tempered, various inert substances such as marble, alabaster, gypsum, silica, limestone, &c., crushed to a powder of more or less fineness. These additions may vary between thirty and fifty per cent. of the cement used. This mode of manufacture allows of the production of "partitioned" work with or without metal borders or frames. In the former case I arrange on the bottom of the mold small strips of tin, copper or other soft metal so as to form the outlines of the design I wish to reproduce. Between these metallic strips I arrange my various shades of cement prepared as above described, taking care to embed these strips completely in the cement. I then allow the cement to set, and I thus obtain on the lower side or face of the plate or slab, the desired "partitioned" design.

When the "partitioned" work is not to have any metallic outlines whether in the case of figures or of mosaics, I prepare a mold having in relief of suitable thickness the lines of the design to be produced. I then arrange between the said projections the colored paste portions in such a manner as to keep the colors exactly inside the projections in the mold. This mode of manufacture is also applicable to the production of decorative designs on a large scale, bas-reliefs, &c., on marble panels. For instance, any object, head, bust, statue or group may be molded in white marble on a ground of colored marble. A bas-relief consisting of any subject of white or colored marble may be molded on a marble ground of different color; also, base-plates, capitals, vases, &c., may be made of marble of different colors, all in one piece; also, by the same process, inscriptions, emblems, numerals, &c., of all kinds may be incrusted or let into slabs or blocks of marble. Finally imitations of woods of all kinds can be made.

The marble slab thus prepared is left alone until the cement has become quite hard, which happens usually after forty-eight hours. The marble must then be rendered impervious, must be rubbed with pumice-stone smoothed and polished. For this purpose the plate is first rubbed down with a rough stone—natural or artificial pumice-stone—to clean the surface well. The marble plate is then coated with the metallic liquor alone or mixed with a small quantity of cement, either by immersing the slab into a bath of the same nature, or by coating it with the said solution by means of a sponge, brush or other equivalent implement. The slab is allowed to dry for twenty-four hours. It is then lightly rubbed with pumice stone, and the same operation is recommenced with the same substance slightly less liquid. The slab is allowed to dry, is then rubbed with pumice stone, and its surface is smoothed by means of suitable stones.

To polish the artificial marble after the manner of natural marble, use is made of a ball or rubber or cloth which has first been moistened with alcohol so as to cause the adherence to it of white tin putty mixed with crushed borax. As soon as the marble has assumed a suitable degree of polish, an additional brilliancy or finishing touch is given to it with a rubber or flannel moistened with alcohol and salt of sorrel.

For marble which is required to undergo repeated washings, such as counters, restaurant tables, &c., the marble after having received its polish must be coated with a preparation consisting of virgin wax melted in a waterbath in essence of turpentine with the addition of some grams of sulphur per liter of turpentine. Before being subjected to the finishing polish, and previous to being coated with the virgin wax preparation, these marbles are heated to a certain temperature in such a manner as to cause the stearine with which the said marbles have been previously coated, to penetrate into the same.

The artificial polish which I preferably employ in the case of decorative marbles on a large scale, is the same as is used for polishing wood.

Having thus described my said invention and the manner of performing the same, what I claim is—

1. In the manufacture of artificial marbles, producing the veining by means of tresses or skeins of silk previously dipped in an acid solution of a metallic sulfate and then impregnated with a very thin cement, dyed to the color desired for the veining, said tresses being then withdrawn vertically through the paste, and the latter being then caused to settle down so as to produce a solid mass having no fissures, substantially as hereinbefore described.

2. Polishing the artificial marbles produced as hereinbefore described, by first using a rubber moistened with alcohol and coated with tin putty and borax, then using a second rubber of flannel moistened with alcohol and salt of sorrel, substantially as described.

3. The herein described process of forming artificial marble consisting in first coating the marble with stearine and then coating the same with a preparation of virgin wax melted in a water bath in essence of turpentine with a small addition of sulphur and then polishing the same, substantially as described.

4. The manufacture of impervious and permanent artificial marbles consisting in first coating the heated marbles with stearine, and then, after they have become dry, coating them with a preparation consisting of virgin wax melted in a water bath in essence of turpentine with the addition of a few grams of sulphur per liter of turpentine, then polishing the same, substantially as hereinbefore described.

In testimony whereof I have hereunto set my hand this 22d day of March, 1894.

GRAND' MONTAGNE.

Witnesses:
ALBERT TROUFONE,
GREGORY PHELAN.